United States Patent [19]

Wraight

[11] Patent Number: 4,721,853
[45] Date of Patent: Jan. 26, 1988

[54] THERMAL DECAY TIME LOGGING METHOD AND APPARATUS

[75] Inventor: Peter D. Wraight, Missouri City, Tex.

[73] Assignee: Schlumberger Technology Corporation, Houston, Tex.

[21] Appl. No.: 4,764

[22] Filed: Jan. 7, 1987

Related U.S. Application Data

[63] Continuation of Ser. No. 825,182, Jan. 31, 1986.

[51] Int. Cl.$^4$ .............................................. G01V 5/00
[52] U.S. Cl. .................................... 250/269; 250/270
[58] Field of Search ............... 250/256, 262, 269, 270

[56] References Cited

U.S. PATENT DOCUMENTS

| | | | |
|---|---|---|---|
| 3,164,720 | 1/1965 | Armistead | 250/270 |
| 3,379,882 | 4/1963 | Youmans | 250/262 |
| 3,662,179 | 5/1972 | Frentrop et al. | 250/262 |
| 3,973,131 | 8/1976 | Malone et al. | 250/270 |
| 4,122,338 | 10/1978 | Smith et al. | 250/262 |
| 4,223,218 | 9/1980 | Jacobson | 250/269 |
| 4,224,516 | 9/1980 | Johnstone | 250/269 |
| 4,267,447 | 5/1981 | Johnstone | 250/269 |
| 4,292,518 | 9/1981 | Johnstone | 250/269 |
| 4,326,129 | 4/1982 | Neufeld | 250/269 |
| 4,424,444 | 1/1984 | Smith, Jr. et al. | 250/270 |
| 4,625,111 | 11/1986 | Smith, Jr. | 250/256 |

Primary Examiner—Janice A. Howell
Attorney, Agent, or Firm—Henry N. Garrana

[57] ABSTRACT

A novel neutron burst timing, detection, and calculation method and apparatus are disclosed for a Thermal Decay Time Logging System. A neutron bursting regime is provided which includes a short burst, long burst repetitive sequence. After a short delay from the short burst, a first series of time gates is provided for accumulating gamma ray counts. After a relatively longer delay from the long burst, a second series of time gates is provided for accumulating gamma ray counts. The thermal neutron decay time constant $\tau$ and the macroscopic capture cross-section $\Sigma$ of the formation are determined through an iterative procedure by which the formation $\tau$ is estimated from the second series of time gates which have been stripped of borehole decay counts determined from the first series of time gates. Similarly, the borehole $\tau$ is estimated from the first series of time gates which have been stripped of formation decay counts determined from the second series of time gates.

42 Claims, 10 Drawing Figures

THERMAL DECAY TIME LOGGING METHOD AND APPARATUS

This is a continuation of application Ser. No. 825,182 filed Jan. 31, 1986.

BACKGROUND OF THE INVENTION

1. Field of the Invention

This invention relates in general to nuclear logging and in particular to a new and improved pulsed neutron logging method and apparatus for determining the thermal decay time constant $\tau_F$ and correlative capture cross-section $\Sigma_F$ of formations surrounding the borehole. Still more particularly this invention relates to a method and apparatus for estimating the formation tau, $\tau_F$, and formation capture cross-section sigma, $\Sigma_F$, more precisely through the simultaneous measurement of the thermal decay time constant, $\tau_B$, and correlative capture cross-section $\Sigma_B$ of borehole materials.

2. Description of the Prior Art

The technological history of thermal decay time or pulsed-neutron capture logging has been developed in prior patents. U.S. Pat. No. 3,379,882 to Arthur H. Youmans issued Apr. 23, 1963 outlines the physics of pulsed nuclear logging and describes the method of irradiating a formation from a borehole tool with a short burst of fast neutrons and measuring the decline rate of slow neutrons or gamma rays which result from thermal neutron capture in the formation as an indication of the identity of the nuclei of the material present in the formation.

The Youmans patent teaches that the measurement of capture gamma rays is actually more directly indicative of what has occurred in the formation after neutron bursting or pulsing than is a "slow" or thermal neutron measurement. But, if a measurement is made of the entire gamma ray flux produced by the neutron pulse, the initial portion of the gamma ray population curve will depend substantially upon the gamma rays produced by the fast neutron processes, and that the latter portions of the gamma ray population depends entirely upon the slow and thermal neutron processes in the formation. For that reason, as Youmans teaches, the inelastic scattering gammas are preferably distinguished from the capture gammas by initiating the detection interval only after the inelastic gammas may be expected to have substantially disappeared. In other words, the detection interval is preferably started only after the relatively short-lived inelastic scattering gamma rays may be expected to have been dissipated in the earth, and when the thermal neutron population has reached its peak.

Youmans recognized that the lifetime curve of thermal neutrons is a composite of captures occurring in borehole materials, in the porous invaded zone surrounding the borehole, and in the uninvaded formation beyond. Youmans indicated that the preferred method of making a neutron lifetime measurement, for quantitative determination of formation characteristics, is to observe the complete decline curve of the neutron induced radiation (thermal neutrons or capture gammas) from the termination of the neutron pulse to the disappearance of all induced radiation (excluding the activation or background gammas). Thereafter, it is possible to select the portion of the curve having decline characteristics most representative of the formation irradiated, and the other declining portions of the curve will represent the borehole and the borehole substances.

It is generally assumed that the thermal neutrons in the borehole will be captured early, and therefore it is the latter portion of the time cycle which is representative of the formation. However, this assumption is predicated on the requirement that the borehole be filled with substances, such as salt water, which have a thermal neutron capture cross-section greater than either oil or rock substances. If, on the other hand, the borehole is filled with fresh water, oil, or air, the neutron lifetime in the borehole may be much greater than that in the formation material, and it is the earlier portion of the curve which will be representative of the formation. Youmans suggests, then, that it may be desirable to assure that the latter portion of the curve is the portion which is representative of the formation, by the expedient of filling the borehole with salt water (or some other suitable substance) before performing the logging operation.

To restate the foregoing in simpler terms, if the borehole fluids have a higher thermal neutron capture cross-section (and a shorter correlative tau or capture time constant) than that of the formation substances, then the early portion of the curve will be representative of the borehole, and the later portion will be representative of the formation. The second two intervals will best indicate the lifetime of the thermal neutrons in the formations.

U.S. Pat. No. 3,662,179 to Frentrop and Wahl issued May 9, 1972 discloses a pulsed neutron logging system which has seen wide commercial application. Frentrop and Wahl invented a three gate system to measure formation tau, and assumed that by waiting a sufficient time after the neutron burst terminated, the borehole gamma rays induced by neutron capture have died out and that the remaining gamma rays result entirely from formation nuclei capture of thermal neutrons and natural and activation (background) gamma rays.

The Frentrop and Wahl patent assumed that the slope of the mid-portion of the logarithm count of gamma rays is a measure of the formation decay time, $\tau_F$. The slope or decay time is determined by sampling the count rates during the first two of the three gates. A third gate is positioned after the formation induced gamma rays have died away and is used to measure background. Background is then subtracted from the readings of Gates I and II before computing decay time. The Frentrop and Wahl system provided variable gate width times and starting locations with respect to the end of the neutron burst, yet the relationship of one to another was fixed.

Gate I starts 2T microseconds ($\mu$sec) after the end of the neutron burst. Gate I lasts T $\mu$sec; Gate II lasts 2T $\mu$sec and Gate III is positioned from 6T to 9T. Assuming an exponential decay, (i.e., $N=A_e{-t/\tau_F}$), T is adjusted until the counts of the gates, $N_1$, $N_2$, $N_3$ satisfied the equation, $$2N_2 - N_1 - N_3 = 0.$$

When the equation is satisfied, adjusting T from cycle to cycle, $T = \tau_F$.

An improvement in measurement accuracy of formation decay time, $\tau_F$, is disclosed in U.S. Pat. No. 4,223,218 to Jacobson, issued on Sept. 16, 1980, U.S. Pat. No. 4,224,516 to Johnstone issued on Sept. 23, 1980, U.S. Pat. No. 4,267,447 to Johnstone issued on May 12, 1981, and U.S. Pat. No. 4,292,518 to Johnstone issued on Sept. 29, 1981. The Jacobson and Johnstone system provides sixteen (16) detection gates as distinguished from the three gate system of Frentrop and Wahl. The entire time scale of the neutron generator burst and gate opening and closings is controlled according to a characteristic time, T. But where as in the Frentrop and Wahl system the T is continuously varied to be identical to the measured value of $\tau$, the Jacobson and Johnstone system adjusts it by surface electronics in discrete steps called F-modes. The variable time-scale, or F-modes, position the gates on the decay curve to most successfully avoid the early casing and borehole signal. Gate I starts approximately $2\tau_F$ $\mu$sec from the end of the minitron burst. The purpose of the time delay between the preceding neutron burst and the beginning of the gating sequence is to permit gamma rays emanating from the immediate borehole environment, (e.g. borehole fluid, casing, cement annulus, tool housing, etc.) to die out before detection of the count rate data from the formation is commenced.

U.S. Pat. No. 4,122,338 to Smith and Pitts issued on Oct. 24, 1978 was an attempt to respond to the problem, recognized as outlined above by Youmans, that, depending on the borehole environment, the gamma ray counts measured after a fixed delay from the end of the neutron burst may include borehole events. In other words, the systems disclosed in the Frentrop and Wahl patent and in the Jacobson and Johnstone patents assume that the borehole thermal decay time, $\tau_B$, is substantially shorter than the thermal neutron decay time of the earth formation surrounding the borehole. The Smith and Pitts patent indicates that this assumption is generally correct if the borehole is filled with a drilling fluid having a high chlorine or salt water content. However, in boreholes containing air, gas, fresh water or oil base muds, the relationship of $\tau_F$ being significantly longer then $\tau_B$ may not hold. Smith and Pitts measure the actual salinity of the borehole fluids. These measurements are used to control the time delay prior to opening the first measurement gate for detecting $\tau_F$, thereby assuring that borehole gamma rays are no longer present when gamma rays are counted.

U.S. Pat. No. 4,326,129 to Neufeld issued on Apr. 20, 1982 discloses a method and apparatus for logging boreholes containing air, gas, fresh water or oil e.g., boreholes having a large borehole decay constant, $\tau_B$, in comparison with the formation decay constant, $\tau_F$. Neufeld specifies measuring an impulse response function h(t) by using a correlator for autocorrelating the output signals from a detector in response to neutron bursts in the borehole. A correlator for crosscorrelating the output signals from the detector with the signals representing the energy pulses obtained from the source is also disclosed. Neufeld expresses the decaying portion of the impulse response function h(t) as a sum of two component functions exponentially decaying at different rates. These component functions are individually associated with the thermal neutron slowing down processes in the formations surrounding the boreholes and in the fluid within the borehole.

Neufeld expresses the impulse response function as $h(t) = Ae^{-\alpha t} + Be^{-\beta t}$ where A, B, $\alpha$ and $\beta$ are constants; $Ae^{-\alpha t}$ represents the neutron population of the formation component; $Be^{-\beta t}$ represents the neutron population of the fluid component in the borehole. The constants $\alpha$ and $\beta$ represent the thermal neutron decay constants of the earth formation and of the fluid in the borehole respectively. Thus, regardless of the relative values of $\alpha$ and $\beta$, Neufeld specifies the measurement of h(t), and then fitting a two exponential model to the measured data to determine $\alpha$ and $\beta$. Neufeld suggests the use of least-squares analysis to determine $\alpha$ and $\beta$ of the two exponential model from the measured h(t) data.

A problem has existed in all of the prior work of pulsed neutron logging in that no method and apparatus has been suggested or devised to more precisely measure the borehole decay constant, $\tau_B$, so that where compensation of the formation decay constant is warranted, a more precise compensation and ultimate value of $\tau_F$ may be determined.

IDENTIFICATION OF OBJECTS OF THE INVENTION

A primary object of this invention is to provide an apparatus and method for timing neutron pulse generation so that the borehole decay constant $\tau_B$ may more accurately be measured without compromising the statistics of the formation tau.

Another object of the invention is to provide a pulsed neutron and measurement regime which simultaneously provides an estimate for borehole decay constant, $\tau_B$, and formation decay constant, $\tau_F$.

Still another object of this invention is to provide a burst-measurement schedule which includes a short neutron burst for enhancing the measurement of borehole decay rate, $\tau_B$, and a long neutron burst for enhancing the measurement of the formation decay rate $\tau_F$.

It is another object of the invention to provide a thermal decay logging bursting regime which allows the neutron generator to be operated at high output thereby providing good counting statistics for determining formation tau, $\tau_F$, while also providing a manageable lower count rate for the measurement of borehole materials tau, $\tau_B$, thereby requiring only small dead-time corrections.

Another object of the invention is to provide a method for determining borehole materials tau, $\tau_B$, and formation tau, $\tau_F$, through an iterative technique by which formation tau is determined from count rate information following the long burst which has been stripped of borehole materials decay signal content and borehole materials tau, $\tau_B$, is determined from count rate information following the short burst which has been stripped of formation decay signal content.

SUMMARY OF THE INVENTION

The objects of the invention as well as other advantages and features of it result from a method and apparatus for detecting the time decay of thermal neutrons in an earth formation surrounding a borehole for determining borehole compensated thermal neutron decay characteristics of the formation. A first short time burst of fast neutrons is provided in a burst-measurement schedule at a location within the borehole thereby irradiating borehole materials and the earth formation adjacent that borehole location. Gamma rays indicative of the concentration of thermal neutrons in the borehole materials and in the formation are detected and counted following the short neutron burst.

Following the detection of gamma rays resulting from the short-burst of neutrons, a relatively long time burst of fast neutrons is applied at substantially the same location within the borehole thereby again irradiating the borehole materials and the earth formation adjacent the borehole location. Gamma rays indicative of the concentration of thermal neutrons in the formation and in the borehole materials following the long neutron burst are detected and counted.

From the count rates of gamma rays detected after the short neutron burst and count rates of gamma rays detected after the long neutron burst, a borehole compensated thermal neutron rate of decay of the earth formation, $\tau_F$, is estimated. The rate of decay of thermal neutrons of the borehole materials, $\tau_B$, is simultaneously determined.

The method and apparatus provides for repeating the short burst-long burst of fast neutrons with measurement gates following each burst while moving the logging tool through the borehole so that gamma rays are accumulated over several bursting/measurement cycles opposite a small borehole region.

According to another feature of the invention, the gamma rays in response to the short burst of neutrons are detected after a short delay time after the end of the first burst of fast neutrons. The gamma rays in response to the long burst of neutrons are detected after a relatively long delay time after the end of the second burst of neutrons.

In a preferred embodiment, the duration of the short burst is relatively long as compared to the expected time constant of the borehole materials, $\tau_B$, but which is relatively short as compared to the expected time constant of the formation $\tau_F$. As a result after the short delay time from the end of the short burst, the total count rate due to the borehole materials and to the formation is approximately equal to the maximum practical counting rate of the signal counting circuits of the logging system and the thermal neutron count rate component due to borehole materials predominates in the total thermal neutron count rate.

In a preferred embodiment, the duration of the long burst is relatively long as compared to the expected time constant of the formation, $\tau_F$, such that after the relatively long delay from the end of the long burst, the total count rate due to borehole materials and to the formation is approximately equal to the maximum practical counting rate of the signal counting circuits of the logging system and the thermal neutron count rate component due to the formation predominates in the total thermal neutron count rate.

The thermal neutron decay time constant of the formation, $\tau_F$, is determined through an iterative procedure by estimating it from the gates following the long burst which have been stripped of borehole decay counts determined from gates following the short burst. Similarly, the borehole materials time constant, $\tau_B$, is estimated from the gates following the short burst which have been stripped of formation decay counts determined from gates following the long burst. The iterative estimation method is terminated after the constants $\tau_F$ and $\tau_B$ fail to change by less than a predetermined amount from one iteration to the next.

As described above, the borehole decay constant is determined from corrected count rate signals following the short burst, and the formation decay constant is determined from corrected count rate signals following the long burst. Of course, where in the unusual case, the decay constant of the borehole is long compared to the decay constant of the formation, the decay constant of the formation would be determined from corrected count rate signals following the short burst and the decay constant of the borehole would be determined from corrected count rate signals following the long burst.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which.

DESCRIPTION OF THE INVENTION

This invention relates to a novel and improved fast neutron bursting and measurement method and apparatus which is described in detail with reference to FIGS. 1, 4 and 5. The apparatus needed to accomplish the method is similar in many respects to that disclosed in U.S. Pat. No. 4,223,218 issued to Jacobson on Sept. 16, 1980 and assigned to Schlumberger Technology Corporation as is this invention. That patent is incorporated by reference to this specification. For an overall description of the tool, telemetry and surface instrumentation, the introductory portion of U.S. Pat. No. 4,223,218 is repeated below, before turning to the bursting and detection schedules and the method of extracting borehole materials tau, $\tau_B$ and formation tau, $\tau_F$ from the data.

Figure 1:
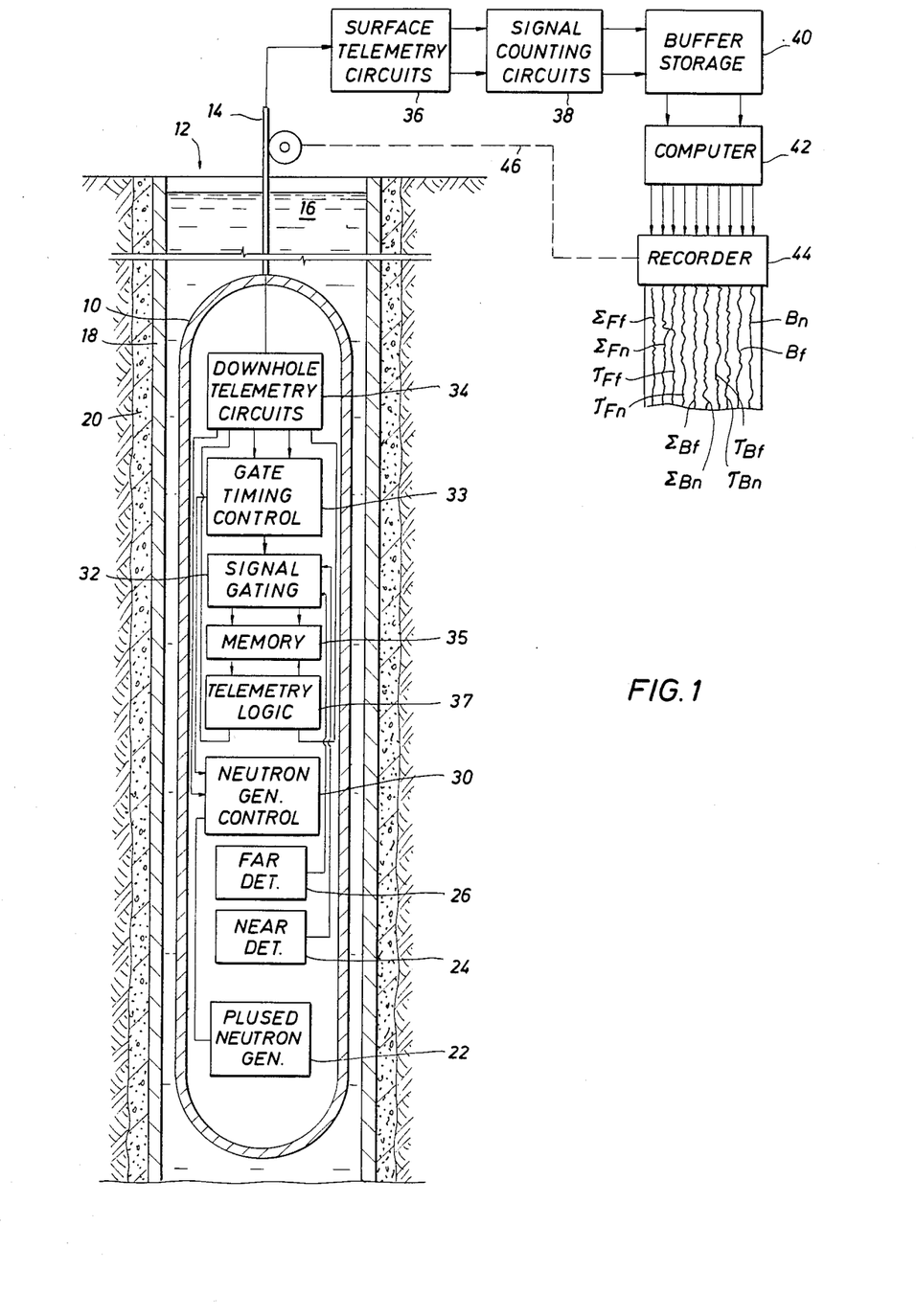
FIG. 1 is a schematic view of a thermal neutron decay downhole tool and associated surface instrumentation.

FIG. 1 shows a well logging tool constructed in accordance with the invention and includes a fluid-tight, pressure-and-temperature resistant sonde or tool 10 that is adapted to be suspended in and moved through a well bore 12 by an armored cable 14. The well bore 12 is illustrated as containing a borehole fluid 16 and as including a steel casing 18 and surrounding cement annulus 20. Although no tubing is shown in the borehole, the tool 10 may if desired be sized for through-tubing use.

The downhole tool 10 includes a pulsed neutron generator 22 and two radiation detectors 24 and 26 that are located at different spacings from the neutron generator 22. The detector 24 spaced closest to the neutron generator is designated the "near" detector and the detector 26 located farther from the neutron source is designated the "far" detector. For the purpose of the present invention, the neutron generator 22 is preferably of the type which generates discrete pulses of fast neutrons, e.g. 14 Mev., and may for example be of the types described in more complete detail in U.S. Pat. No. 2,991,364 to C. Goodman, dated July 4, 1961, and U.S. Pat. No. 3,546,512 to A. H. Frentrop, dated Dec. 8, 1970. Operation of the neutron generator 22 is controlled in part by a neutron generator control circuit 30, and this circuit may also be of the types described in the aformentioned patents. The detectors 24 and 26 may be of any construction suitable for the detection of the thermal neutron concentrations in the surrounding earth formation and, to that end, may be of the thermal neutron sensitive type, e.g. helium 3 filled proportional counters, or of the gamma ray sensitive type, such as thallium-activated sodium iodide detectors. In the preferred embodiment, the detectors 24 and 26 preferably comprise sodium iodide scintillation detectors and, in this respect, will be understood to include the usual photomultiplier tubes, photomultiplier high voltage supplies, and amplifier-discriminators (not shown). It will also be understood that other downhole power sources (not shown) are provided as required to drive the neutron generator 22 and other downhole circuits. Power for the well tool 10 is supplied over the cable 14 from a surface power supply (not shown), as is conventional.

Output pulses from the near detector 24 and the far detector 26, representative of the concentration of thermal neutrons in the irradiated formation, are applied to signal gating circuits 32. The signal gating circuits 32 are controlled by gate timing circuits 33, which also control the operation of the neutron generator control circuit 30. From the signal gating circuits 32 the detector signals are counted and stored in memory circuits 35 and thence, under control of telemetry logic circuits 37, are applied to downhole telemetry circuits 34 for transmission to the surface over the cable 14. The overall design of the neutron generator control circuit 30, the signal gating circuits 32, the gate timing circuits 33, the memory circuits 35, and the telemetry circuits 34 is similar to that described in the above mentioned U.S. Pat. No. 4,223,218, but are not described here for the sake of brevity. The circuits are designed to achieve the timing schedules for bursting and detection according to that illustrated in FIG. 4 which is discussed in detail below The downhole telemetry circuits 34 may be of any known construction for encoding, time division multiplexing, or otherwise preparing the data-bearing signals applied to them from the telemetry logic circuits 37 and for impressing such data on the cable 14. At the earth's surface, the data-bearing signals from the near and far detectors 24 and 26, respectively, are amplified, decoded, demultiplexed and otherwise processed as needed in the surface telemetry circuits 36, which may also be conventional. The telemetry circuits 34 and 36 also include circuits for the receipt and transmission, respectively, of command messages from the surface. Suitably, the circuits 34 and 36 comprise a bi-directional data telemetry system useful for these purposes and having a 10K bit per second upward data rate.

Following surface telemetry circuits 36 the near-detector and far-detector signals are separately counted in signal counting circuits 38 to acquire the thermal neutron decay curve data over a desired accumulation interval Δt. Upon termination of the data accumulation time Δt, which may be selected, for example, to correspond to a desired interval of depth in accordance with logging speed of the tool, the count rate data accumulated in the signal counting circuits 38 and transferred to buffers 40 and the signal counting circuits 38 are reset to zero.

From storage 40, the count rate data are processed in a computer 42, which suitably comprises a microprocessor or, alternatively, a general purpose digital computer such as that manufactured by Digital Equipment Corporation, Maynard, Mass., under the designation PDP-11. As is described more fully hereinafter, the computer 42 processes the count rate data from the respective detectors to develop various desired outputs, including, for example, the decay time constants of the bore hole and formation as measured with the near detector, $\tau_{Bn}$ and $\tau_{Fn}$, and the decay time constants of the borehole and formation as measured with the far detector, $\tau_{Bn}$ and $\tau_{Fn}$, the corresponding macroscopic capture cross-sections $\Sigma_{Bn}$, $\Sigma_{Bf}$, $\Sigma_{Fn}$ and $\Sigma_{Ff}$, and various other selected outputs such as background counting rating $B_n$ and $B_f$, from the respective detectors.

All of these outputs may be recorded in conventional fashion as a function of tool depth in a recorder 44. The usual cable-following mechanical linkage, indicated diagrammatically at 46 in FIG. 1, is provided for this purpose.

ANALOGY OF THE BOREHOLE MATERIALS AND FORMATION CHARGE-UP AND DECAY OF THERMAL NEUTRONS TO AN ELECTRICAL CIRCUIT

Figure 2:
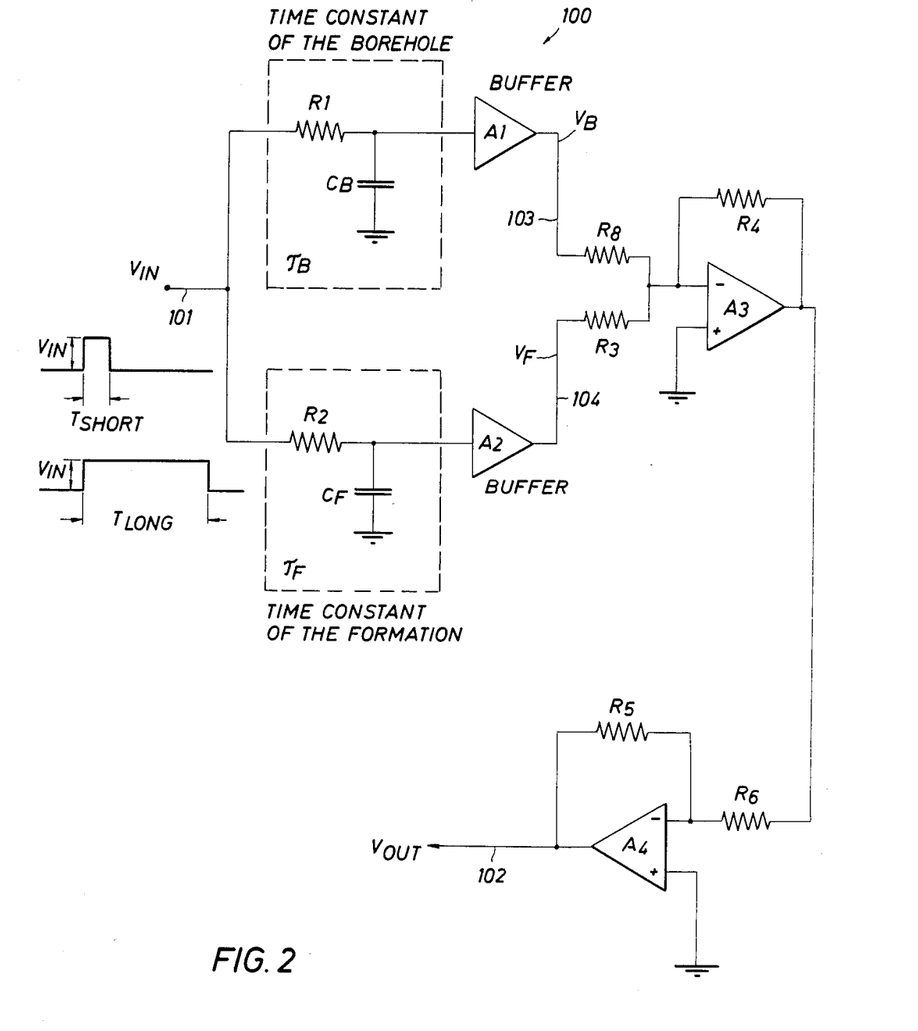
FIG. 2 is a schematic electrical circuit analog of borehole materials and the formation in response to fast neutron bursting in a borehole and illustrates by analogy the thermal neutron charging and decay characteristics of the borehole materials and the formation.

As an aid to the understanding of the "charge-up" and decay of thermal neutrons in the borehole materials and surrounding formations, the electrical analog of FIG. 2 is instructive. Circuit 100 includes an $R_1C_B$ circuit and buffer amplifier $A_1$ in parallel with an $R_2C_F$ circuit and buffer amplifier $A_2$. The $R_1C_B$ circuit is an analogy of the charging and decay characteristics of the borehole materials, where the time constant of the circuit $$\tau_B = 1/R_1C_B$$

is an analogy to the composite time constant of the borehole materials. Likewise, the $R_2C_F$ circuit is an analogy of the charging and decay characteristics of the formation surrounding the borehole, where the time constant of the circuit $$\tau_F = 1/R_2C_F$$

is an analogy to the time constant of the formation. The circuit of FIG. 2 produces a time varying output voltage on lead 102 in response to a square pulse applied on lead 101.

The circuit of FIG. 2 is instructive by considering the charging and decay of voltages $V_B$ on lead 103 and $V_F$ on lead 104 as components of the voltage on lead 102 in response to short and long voltage pulses $V_{in}$ on lead 101.

Assuming zero initial conditions on the capacitors $C_B$ and $C_F$, the voltages as a function of time t measured from the beginning of the pulse $V_{in}$ can be written, $$V_B = V_{in}(1 - e^{-t/\tau_B}),$$

$$V_F = V_{in}(1 - e^{-t/\tau_F}).$$

If the duration of the short voltage pulse is $t_s$, then the voltage level on the output lead 102 at the end of the short voltage pulse is $$V_{out} = V_{in}(1 - e^{-tS/\tau_B}) + V_{in}(1 - e^{-tS/\tau_F}).$$

Likewise, assuming zero initial conditions on the capacitor $C_B$ and $C_F$, the combined voltage level on output lead 102 at the end of the long pulse is $$V_{out} = V_{in}(1 - e^{-tL/\tau_B}) + V_{in}(1 - e^{-tL/\tau_F}).$$

= borehole component + formation component.

An estimate of the amplitude of the formation component voltage at the end of the long voltage pulse allows the estimate of the formation voltage at the end of a short voltage pulse, $$\frac{\text{Amplitude Formation Short}}{\text{Amplitude Formation Long}} = \frac{V_I}{V_I} \frac{(1 - e^{-tS/\tau_F})}{(1 - e^{-tL/\tau_F})}$$

or $$AFS = AFL \frac{(1 - e^{-tS/\tau_F})}{(1 - e^{-tL/\tau_F})}.$$

Likewise, an estimate of the amplitude of the borehole component voltage at the end of the short voltage pulse allows the estimate of the amplitude of the borehole voltage at the end of the long voltage pulse, $$\frac{\text{Amplitude Borehole Long}}{\text{Amplitude Formation Long}} = \frac{V_I}{V_I} \frac{(1 - e^{-tL/\tau_B})}{(1 - e^{-tS/\tau_B})}$$

or $$ABL = ABS \frac{(1 - e^{-tL/\tau_B})}{(1 - e^{-tS/\tau_B})}.$$

SHORT-BURST AND LONG-BURST CHARGING AND DECAY IN THERMAL DECAY TIME LOGGING

Figure 3A:
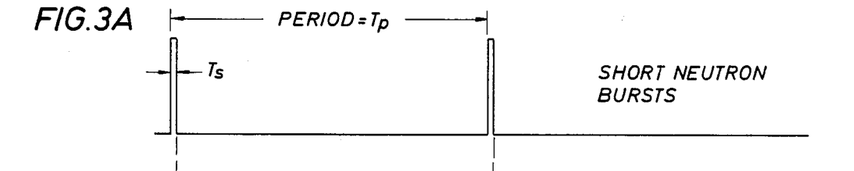
FIGS. 3A-3F illustrates the charging and decay characteristics of borehole materials and the formation individually in response to relatively short and relatively long bursts of fast neutrons.
Figure 3B:
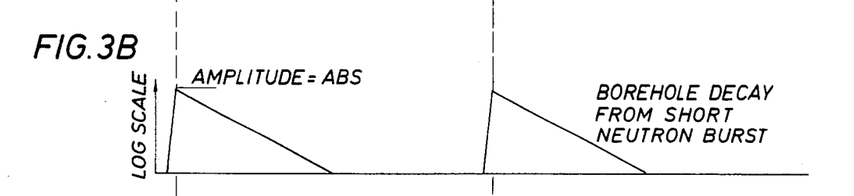
Figure 3C:
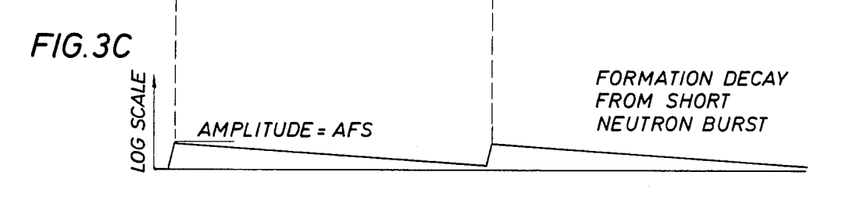

In thermal decay time logging practice, the time constant of the formation $\tau_F$ is usually considerably longer than the time constant of the borehole materials $\tau_B$. If the time length of the neutron burst is short, as illustrated in FIG. 3A, the shorter time constant of the borehole materials allows the thermal neutron population to charge to a higher relative amplitude as illustrated in FIG. 3B than the amplitude of thermal neutron population of the formation as illustrated in FIG. 3C. Also, the decay rate of the borehole material, allows the thermal neutron population to decay essentially to zero for a period between pulses $T_P$ as illustrated in FIG. 3B, while the longer time constant of the formation causes the decay to occur more slowly, with possibly a few thermal neutrons continuing to exist at the start of the next burst.

Figure 3D:
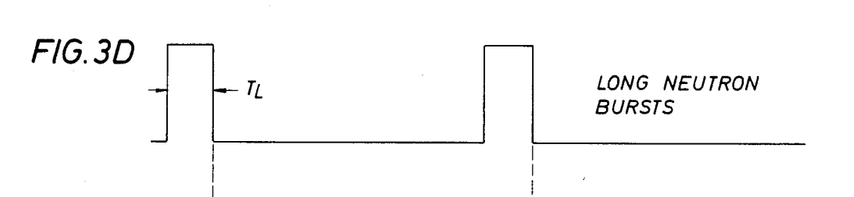
Figure 3E:
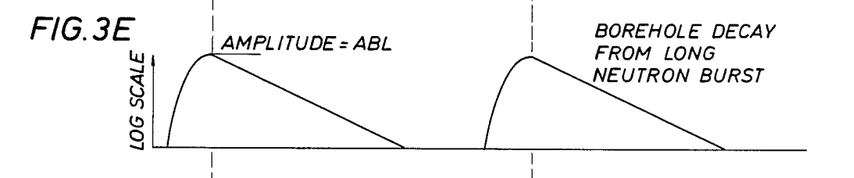
Figure 3F:
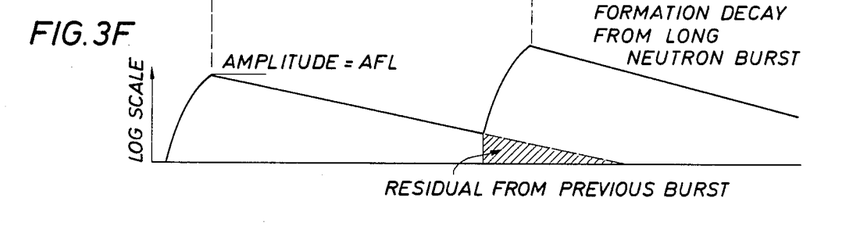

FIGS. 3D, 3E and 3F illustrate the effect of the long neutron burst on the charging and decay of thermal neutrons in the borehole materials and in the formation in response to periodic bursts of a longer time length. In the example of FIGS. 3D, 3E and 3F, the bursting time length $T_L$ is relatively long with respect to the formation time constant $\tau_F$, and is very long with respect to the borehole materials. As illustrated in FIG. 3E, the thermal neutron population of the borehole materials saturates at its "fully charged" level toward the end of the long burst and then decays at its relatively short time constant rate. Simultaneously, the formation charge up as illustrated in FIG. 3F has a longer time to charge, (as compared to the charge up of FIG. 3C) and therefore achieves a high level at the end of the long burst. The decay then begins and continues to decay at a slower rate than the borehole materials and produces residual thermal neutrons into the next cycle for the example period $T_P$ and time constant $\tau_F$ illustrated.

SHORT BURST, LONG BURST THERMAL NEUTRON LOGGING AND STRIPPING OF FORMATION DECAY COUNT RATE INFORMATION FROM THE TOTAL COUNT RATE FOLLOWING THE SHORT BURST AND STRIPPING OF BOREHOLE DECAY RATE INFORMATION FROM THE TOTAL COUNT RATE FOLLOWING THE LONG BURST

According to the invention, short burst-long burst cycles are provided to irradiate the formation and unavoidably, the borehole materials. The short burst is of a duration which is relatively long, as compared to the expected time constant of the borehole materials, $\tau_B$, but is relatively short as compared to the expected time constant of the formation $\tau_F$. The short burst time length is selected such that after a short delay from the end of the short burst, the total count rate of the "charged" borehole materials and the formation is approximately equal to the maximum counting rate of signal counting circuits 38 for the near detector 24 and the far detector 26 (FIG. 1). Due to the shorter time constant of the borehole materials, $\tau_B$, the thermal neutron count rate component due to borehole materials predominates in the total thermal neutron count rate.

The long burst, following a detection period of the short burst, is of a relatively long duration as compared to the expected time constant of the formation decay constant $\tau_F$, such that after a longer delay (as compared to the delay after the short burst) from the end of the long burst, the total count rate due to the borehole materials and to the formation is approximately equal to the maximum counting rate of signal counting circuits 38 for the near detector 24 and the far detector 26. After the delay following the long burst, the thermal neutron count rate component due to the formation predominates in the total thermal neutron count rate.

The predominance of formation thermal neutron count rate information in the signal following the long burst enables an estimate of the formation decay component. Using a charge up relation obtained by analogy to the model presented in FIG. 2, an estimate of the formation component following the short burst is determined. Such formation component is "stripped" from the total count rate information following the short burst which enables an estimate of the borehole materials component which results from the short burst.

Again using a charge up relation by analogy to the model of FIG. 2, an estimate of the borehole materials component following the long burst is determined. Such borehole materials component is "stripped" from the total count rate information following the long burst and the formation component which results from the long burst is re-estimated. The procedure is repeated until the estimates of the formation component and the borehole component changes by less than predetermined amounts from one iteration to the next.

The preferred bursting-detection schedules according to the invention and the details of the stripping methods follow.

BURSTING AND DETECTION SCHEDULE

Figure 4:
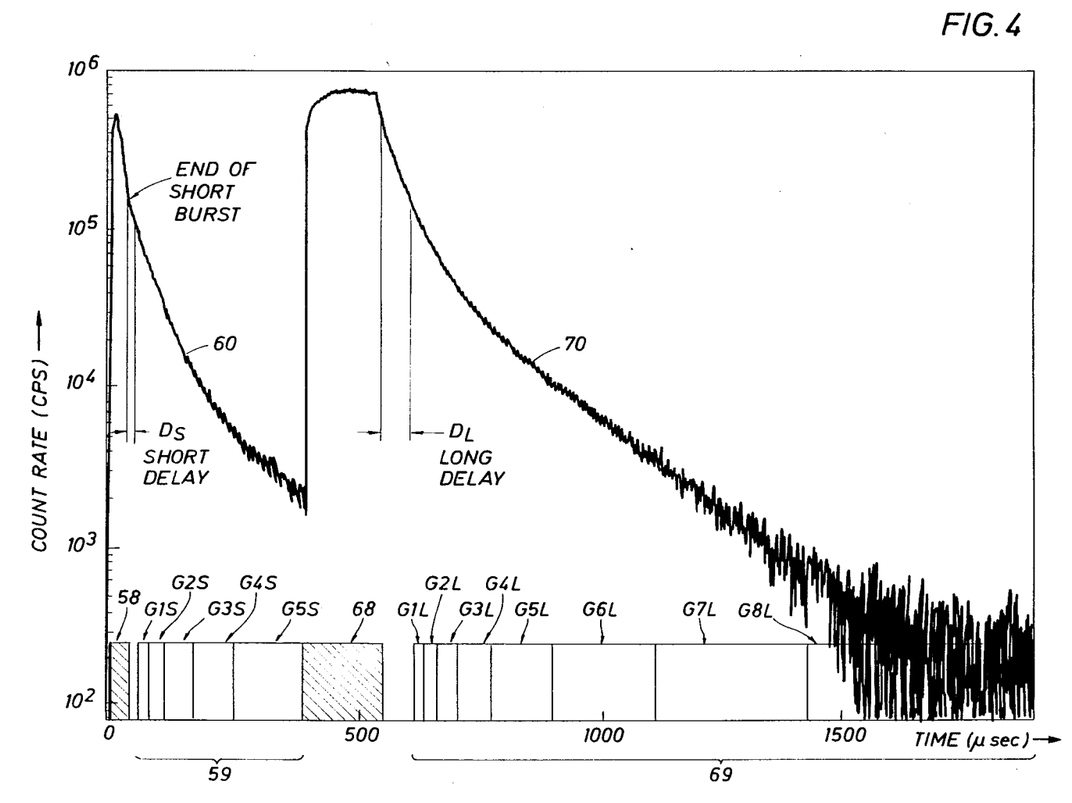
FIG. 4 is a graphical representation of logarithmic count rate plotted as a function of time and showing bursting schedules, gating schedules and normalized logarithmic count rates which result from short and long neutron bursts.

FIG. 4 illustrates the fast neutron bursting schedule and the counting gates following each neutron burst. Curves 60 and 70 represent, respectively the variation with time of the logarithmic counting rate of thermal neutron capture gamma rays following irradiation first with the short burst 58 of fast neutrons and the long burst 68 of fast neutrons.

Preferably the time length of the long burst 68 and the time length of the short burst 58 are fixed lengths: the short burst 58 is 20 μsec; the long burst is 160 μsec. A series 59 of first counting gates, namely five counting gates, $G_{1S}$–$G_{5S}$, are provided following a "short" delay $D_S$ after the short burst 58. A series 69 of second counting gates, namely eight counting gates, $G_{1L}$–$G_{8L}$ are provided following a "long" delay $D_L$ after the long burst 68. The long burst 68 follows immediately after the last gate $G_{5S}$ of the series 59 of first counting gates. Table I below presents the timing sequence for the bursting, delays and counting gates of the preferred embodiment of the invention. Similar sets of timing gates are used for both the near and far gamma ray detectors.

TABLE I

| Item | BEGIN TIME (μsec) | DURATION (μsec) |
|---|---|---|
| Short Burst 58 | 0 | 20 |
| Short Delay $D_S$ | 20 | 18 |
| Gate $G_{1S}$ | 38 | 22 |
| Gate $G_{2S}$ | 60 | 28 |
| Gate $G_{3S}$ | 88 | 50 |
| Gate $G_{4S}$ | 138 | 97 |
| Gate $G_{5S}$ | 235 | 153 |
| Long Burst 68 | 388 | 160 |
| Long Delay $D_L$ | 548 | 60 |
| Gate $G_{1L}$ | 608 | 14 |
| Gate $G_{2L}$ | 622 | 18 |
| Gate $G_{3L}$ | 640 | 40 |
| Gate $G_{4L}$ | 680 | 76 |
| Gate $G_{5L}$ | 756 | 125 |
| Gate $G_{6L}$ | 881 | 210 |
| Gate $G_{7L}$ | 1091 | 340 |
| Gate $G_{8L}$ | 1431 | 449 |
| Cycle Time | 1880 μsec | |

After 128 cycles of the dual burst timing scheme there is a delay of 3 msec (not illustrated) after which a background gate of 15 msec is provided to measure the activation count rate of the corresponding detector. The corresponding background count rate is thus determined for the near detector 24 and the far detector 26. These two background count rates may be recorded on the log recorder 44 and used in the estimate of borehole decay rate, $\tau_B$, and formation decay rate, $\tau_F$, as explained below.

Ideally, to obtain the optimum decay curve from which to calculate both decay constants, the neutron burst should be as short as possible. However a neutron generator or "minitron" as described in U.S. Pat. Nos. 2,991,364 and 3,546,512 referenced above cannot operate at its maximum output when driven at short bursts at a low repetition rate, i.e., duty factors less than 5%. The count rate of gamma rays detected a relatively long time from the end of a short burst, which contains mainly the information of the thermal neutron decay in the formation, will be very low and highly affected by background counts. Its measurement would be statistically inaccurate.

However, if the burst is made longer in time in order to increase the minitron output, the precision of the formation tau determination improves, but the count rate increases greatly in the time immediately following the burst. This extremely high count rate requires a large, and consequently unreliable, dead time correction in the signal counting circuits 38 of FIG. 1. Such dead time occurs where gamma rays are impinging upon detectors 22 and 24 in great numbers, some of which are occurring essentially at precisely the same time. Dead time corrections are made as a function of total counts on the basis that the more counts per unit time measured, the greater the probability that a certain number of the detected gamma rays occurred at precisely the same time.

Thus, the short burst 58—long burst 68 regime depicted in FIG. 2 according to the invention results in the following advantages.

The short burst-long burst regime of FIG. 4 results in a high duty factor (approximately 9%) for the neutron generator. A high duty factor allows the neutron generator to be operated at its maximum output. Thus a short burst may be provided in the bursting/detection regime while simultaneously providing for the neutron generator to be running at its maximum output.

Dual time length bursting of the borehole materials and the formation results in a reduction of the total number of detected gamma rays resulting from absorption of thermal neutrons after the short burst. As indicated above, the borehole materials component predominates in the total signal following the short burst. A reduction of total gamma rays detected in the time following the narrow burst 58 requires only small dead time corrections using practical amplifier/discriminator circuitry in counting circuits 38. Better statistical accuracy of the estimate of the number of gamma rays resulting from the borehole materials is achieved. In a nutshell, a "good" borehole signal is obtained following the short burst.

The total gamma ray count rate resulting from thermal neutron absorption following the long burst is extremely high immediately after the long burst ends. Such a high count rate immediately after the long burst is due to the fact that borehole materials have been "charged-up" to near their saturation level. However a relatively long delay $D_L$ is provided after the long neutron burst 68 so that the total count rate due to both the formation component and the borehole materials component has decayed to a level where large dead time corrections in the counting circuitry 38 may be avoided. During the delay $D_L$, the faster decaying borehole materials decreases sufficiently such that the measured count rate signals measured in the counting gates G1L–G8L are predominately from the formation. In a nutshell, a "good" formation signal is obtained following the long burst.

ITERATIVE STRIPPING OF BOREHOLE COMPONENT AND FORMATION COMPONENT FROM TOTAL COUNT RATE MEASUREMENTS

Figure 5:
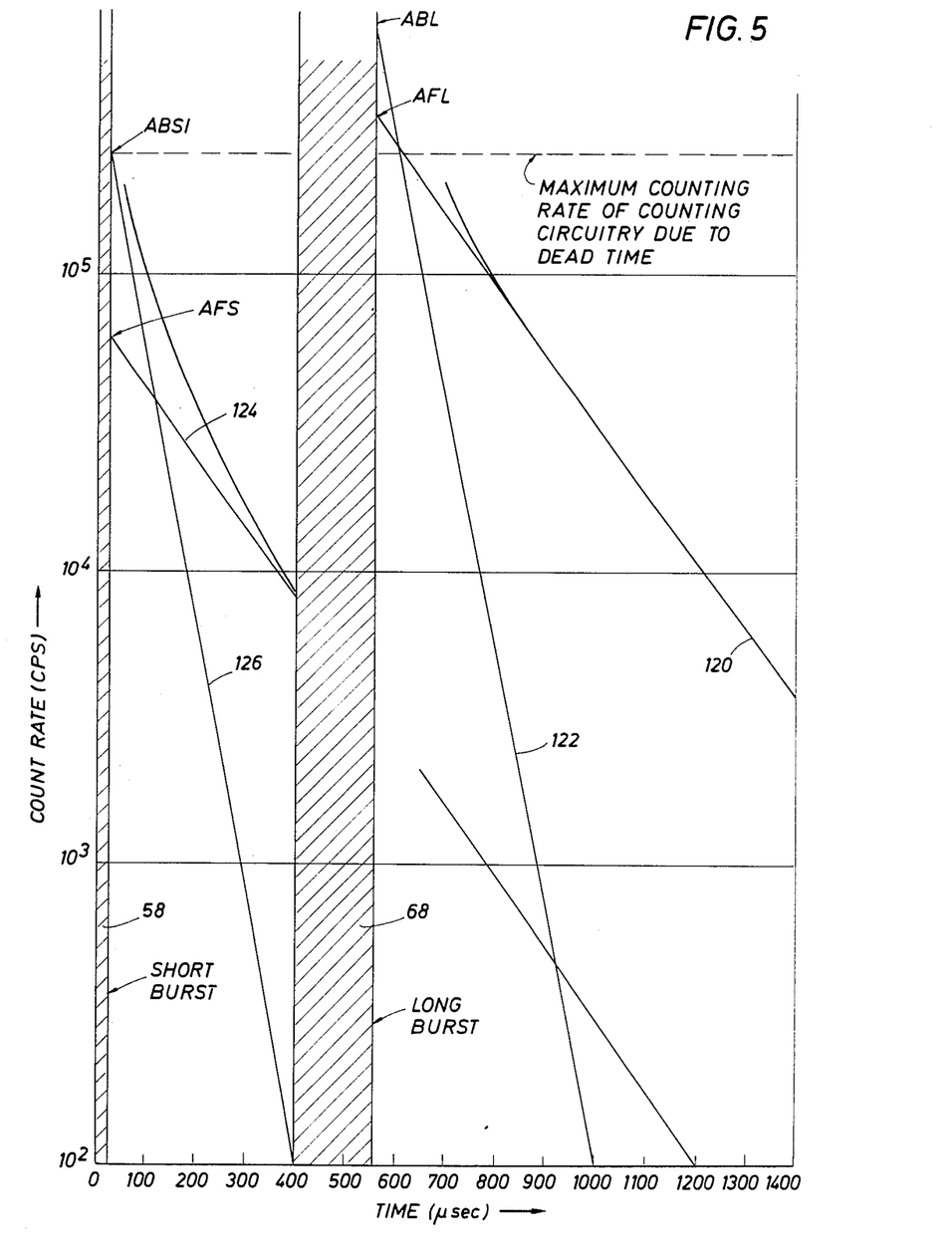
FIG. 5 is a graphical representation of total logarithmic count rates following a short burst and a long burst of fast neutrons and illustrates an iterative stripping method by which formation decay characteristics are determined from count rate information following the long burst stripped of count rates representative of borehole materials, and borehole materials decay characteristics are determined from count rate information following the short burst stripped of count rates representative of the formation.

FIG. 5 illustrates the method for determining the formation decay signal following the long burst 68 by its initial value AFL and time constant $\tau_F$ and the borehole materials decay signal following the short burst 58 characterized by its initial value ABS and time constant $\tau_B$. The gates GL illustrated in FIG. 4 following long burst 68 include gates G1L–G8L. The gates GS include gates G1S–G5S.

The iterative stripping method preferably includes the step of converting count rate information in gates GS and GL to natural logarithmic values so that straight lines may be fitted numerically or graphically as illustrate in FIG. 5, but of course exponential functions may be fitted directly to the unconverted count rates of the gates. In any case, a first estimate is made of the decay exponential function of formation gamma rays following the long burst 68. Preferably, only the later occurring gates G5L, G6L, G7L, G8L are used for the first estimate of the straight line 120 (on a logarithmic plot). It is seen from FIGS. 4 and 5 that the gates G5L–G8L are sufficiently delayed after the end of the long burst to have only a very small component from the borehole because it will generally have predominantly decayed away. Thus, a fit to the data of gates G5L–G8L results in a first estimate of the formation exponential function of the form, $$f_{FL1}(t'') = (AFL1)e^{-t''/\tau_{F1}}$$

where AFL1 is the first estimate of the number of gamma rays occurring in the formation at the end of the long burst 68, $\tau_{F1}$ is the first estimate of the time decay constant of gamma rays resulting from absorption of thermal neutrons in the formation, and t'' is a time variable from the end of the long burst.

Because the formation decay component $f_{FL1}(t'')$ created from the long burst will not necessarily have died away completely before the bursting cycle repeats itself (that is before the next burst), the residual from the previous long burst is subtracted from the short burst decay gates GS and also the long burst decay gates GL. The residual from the previous long burst is illustrated in FIG. 3F. The residual count rate from the previous long burst can be described as $$R = (AFL1)e^{-\frac{(t_1 + t)}{\tau_{F1}}}$$

where $t_1$ is the time from the end of the long burst to the start of the next short burst and t is the time from the start of a new bursting cycle.

Thus, residual free signals GS* and GL* are obtained by subtracting from each gate GS and GL the number of counts in them contributed by R, that is, $$GS^* = GS - (AFL1)e^{-\frac{(t_1+t)}{\tau_{F1}}}$$

$$GL^* = GL - (AFL1)e^{-\frac{(t_1+t)}{\tau_{F1}}}$$

where the exponential function is evaluated for $t_1$ and t corresponding to each gate position following the start of the cycle.

It is generally sufficient to subtract out only the formation residual component, because for usual short values of borehole materials time constant, the borehole component 122 of FIG. 5 will have died away before the bursting-detection cycle repeats itself.

Next, the amplitude of the formation exponential component following the short burst is determined by using the "charge up" of the formation in response to formation bursts of different lengths. Thus, the first estimate of the amplitude of the formation exponential as a result of the short neutron burst is obtained from the relation, as developed previously, $$AFS1 = AFL1 \frac{(1 - e^{-t_S/\tau_{F1}})}{(1 - e^{-t_L/\tau_{F1}})}$$

where $t_S$ = the duration of the short burst (preferably 20 μsec)
$t_L$ = the duration of the long burst (preferably 160 μsec),
and AFL1 = the first estimate of the number of gamma rays occurring in the formation following the long burst.

Having determined the value of AFS1, it is assumed that the same time constant $\tau_{F1}$ obtained from the long burst gate GL represents the formation component following the short burst, that is, $$f_{FS1}(t') = (AFS1)e^{-t'/\tau_{F1}}$$

where t' is a time variable from the end of the short burst.

Next, the formation decay count rates resulting from the short burst are subtracted or "stripped" from the residual corrected gates GS*, GL*, that is, $$GS^{**} = GS^* - AFS1e^{-t'/\tau_{F1}}, \text{ and}$$

$$GL^{**} = GL^* - AFS1e^{-t'/\tau_{F1}}$$

where t' is measured from the end of the short burst to each of the gates.

Now having count rate information, GS, which is substantially free of the formation decay, an exponential function is fit (a straight line is fit to logarithmic data) to the GS gates to provide an estimate of borehole tau, $\tau_{B1}$ and the borehole amplitude following the short burst. Straight line 126 of FIG. 5 illustrates the first estimate of the borehole component following the short burst 58 on the logarithmic plot. As a result, the borehole component is determined of the form, $$f_{BS1}(t') = (ABS1)e^{-t'/\tau_{B1}}$$

where ABS1 is the first estimate of the number of gamma rays occurring in the borehole at the end of the short burst, $\tau_{B1}$ is the first estimate of the time decay constant of thermal neutrons in the borehole materials, and t' is a time variable measured from the end of the short burst.

Next a first estimate of the borehole materials decay exponential function following the long burst of the form, $$f_{BL1}(t'') = (ABL1)e^{-t''/\tau_{B1}}$$

by estimating ABL1, as explained above, from a thermal neutron (gamma ray) charge-up relation, $$ABL1 = (ABS1)\frac{(1 - e^{-t_L/\tau_{B1}})}{(1 - e^{-t_S/\tau_{B1}})}$$

where ABL1 is the first estimate of the number of gamma rays occurring in the borehole materials at the end of the long burst and t'' is a time variable measured from the end of the long burst.

Next an estimate of the signal level of the series of gates following the long burst due only to the formation decay of gamma rays following the long burst is obtained by subtracting or "stripping" the count rate signals which result from the borehole decay exponential function $f_{BL1}(t'')$ from the second residual free signals GL, that is, $$GL* = GL** - (AFL1)e^{-t''/\tau_{B1}}.$$

Although not generally required, the stripped gates GL* can be corrected for any residual component in the gates following the long burst from the borehole materials following the short burst, that is, $$GL = GL* - (ABS1)e^{-t'/\tau_{B1}}.$$

Now, GL* (or GL**, if required) are count rate gates which are substantially free of borehole component.

Next an improved estimate of the decay characteristics of the formation gamma rays following the long burst of the form $$f_{FL1}*(t'') = (AFL1*)e^{-t''/\tau_{F1}*}$$

is obtained from the time gate signals of GL***. Preferably gates G4L–G8L are used with the revised estimated in that the gates used for the estimation may be moved closer to the end of the long burst, because most of the borehole component of the component signal has been stripped out.

Starting with "raw" data, that is uncorrected for residual count rates, GL, and the improved estimate of formation decay time constant $\tau_{F1}*$ and formation component amplitude AFL1*, the procedure starts again as above at the residual R determination. The estimation cycle is repeated with each iteration of the cycle taking an "extra" gate toward the end of the long burst to obtain the revised improved estimate of $\tau_{F1}*$ and AFL1*. If due to excessive count rates following the long burst the gate G1L is not unable, then only gates G2L through G8L are used for determining $\tau_{F1}*$ and AFL1*. The iteration stops where $\tau_F$ and $\tau_B$ do not change more than a predetermined amount and all the gates that can be used following the long burst have been used.

The same procedure for data accumulated in the near detector 24 is performed on data accumulated in the far detector 26. Each decay constant is also transformed by a proportionality constant to obtain a correlative cross-section sigma, $\Sigma = 4545/\tau$. One or more of the variables $\tau_{Bn}, \tau_{Bf}, \Sigma_{Bn}$, and $\Sigma_{Bf}$, may be determined and recorded as a function of borehole depth on recorder 44 as illustrated in FIG. 1 where the subscript B represents borehole materials, n represents near detector and f represents the far detector. Likewise, the variables $\tau_{Fn}, \tau_{Ff}, \tau_{Fn}$, and $\Sigma_{Ff}$ may be recorded where the subscript F represents the formation.

Various modifications and alterations in the described structures will be apparent to those skilled in the art of the foregoing description which does not depart from the spirit of the invention. For this reason, these changes are desired to be included in the appended claims. The appended claims recite the only limitation to the present invention and the descriptive manner which is employed for setting forth the embodiments and is to be interpreted as illustrative and not limitative.

What is claimed is:

1. In a logging system having a fast neutron generating means and detecting means for detecting indications of thermal neutrons, a method for determining thermal neutron decay characteristics of borehole materials and the surrounding earth formation comprising the steps of
   irradiating the borehole materials and earth formations with a first burst of fast neutrons,
   detecting count rates of indications of the concentration of thermal neutrons in the formation and borehole materials following said first burst and generating first signals representative thereof,
   said first burst being of a first duration, such that after a first delay from the end of the first burst, the thermal neutron count rate component due to borehole materials predominates in the total thermal neutron count rate,
   irradiating the borehole materials and earth formation with a second burst of fast neutrons,
   detecting count rates of indications of the concentration of thermal neutrons in the formation and borehole materials following said second burst and generating second signals representative thereof,
   said second burst being of a second duration such that after a second delay from the end of the second burst, the thermal neutron count rate component due to the formation predominates in the total thermal neutron count rate, and
   determining from said first and second signals the thermal decay constant of the formation $\tau_F$.

2. In a logging system having a fast neutron generating means and detecting means for detecting indications of thermal neutrons, a method for determining thermal neutron decay characteristics of borehole materials and the surrounding earth formation comprising the steps of
   irradiating the borehole materials and earth formations with a first burst of fast neutrons,
   detecting count rates of indications of the concentration of thermal neutrons in the formation and borehole materials following said first burst and generating first signals representative thereof,
   said first burst being of a first duration which is relatively long as compared to the expected time constant of the borehole materials, $\tau_B$, but being relatively short as compared to the expected time constant of the formation, $\tau_F$, such that after a first delay from the end of the first burst, the total count rate due to the borehole materials and to the formation is approximately equal to the maximum counting rate of said detecting means and the thermal neutron count rate component due to borehole materials predominates in the total thermal neutron count rate,
   irradiating the borehole materials and earth formation with a second burst of fast neutrons,
   detecting count rates of indications of the concentration of thermal neutrons in the formation and borehole materials following said second burst and generating second signals representative thereof,
   said second burst being of a second duration relatively long as compared to the expected time constant of the formation, $\tau_F$, such that after a second delay from the end of the second burst, the total count rate due to the borehole materials and to the formation is approximately equal to the maximum counting rate of said detecting means and the thermal neutron count rate component due to the formation predominates in the total thermal neutron count rate, and
   determining from said first and second signals the thermal decay constant of the formation $\tau_F$.

3. The method of claim 2 wherein
said first burst is of a duration of about 20 microseconds,
said first delay after the end of said burst is about 18 microseconds,
said second burst is of a duration of about 160 microseconds, and
said second delay after the end of said second burst is about 60 microseconds.

4. The method of claim 2 further comprising the step of
simultaneously determining from said first and second signals the thermal decay constant of the borehole materials $\tau_B$.

5. The method of claim 4 wherein said steps of determining the constants $\tau_F$ and $\tau_B$ comprise the substeps of
(a) estimating the constant $\tau_F$ of a formation decay exponential resulting from said second burst from said second count rate signals,
(b) stripping count rate signals from said first count rate signals of a formation decay exponential having said constant $\tau_F$ resulting from said first burst to produce stripped first count rate signals,
(c) estimating the constant $\tau_B$ of a borehole decay exponential resulting from said first burst from said stripped first count rate signals,
(d) stripping count rate signals from said second count rate signals of a borehole decay exponential having said constant $\tau_B$ resulting from said second burst to produce stripped second count rate signals,
(e) re-estimating the constant $\tau_F$ of said formation decay exponential resulting from said second burst from said second count rate signals, and
(f) repeating steps (b) through (e) until the constants $\tau_F$ and $\tau_B$ change by less than a predetermined amount from one iteration to the next.

6. A borehole logging method for determining thermal neutron decay characteristics of the formation adjacent the borehole, comprising the steps of,
providing a first relatively short time burst of fast neutrons at a location within the borehole thereby irradiating borehole materials and the earth formation adjacent said borehole location,
detecting indications of the concentration of thermal neutrons in the formation and in said borehole materials following said short neutron burst and generating first signals in response thereto,
providing a relatively long time burst of fast neutrons at substantially the same said location within the borehole thereby again irradiating said borehole materials and the earth formation adjacent said borehole location,
detecting indications of the concentration of thermal neutrons in the formation and in said borehole materials following said long neutron burst and generating second signals in response thereto,
determining from said first signals and from said second signals the rate of decay of thermal neutrons of said earth formation, $\tau_f$.

7. The method of claim 6 further comprising the step of
determining from said first signals and from said second signals the rate of decay of thermal neutrons of said borehole materials, $\tau_B$.

8. The method of claim 7 further comprising
determining the correlative capture cross-section of the borehole materials $\Sigma_B = 4545/\tau_B$,
and determining the correlative capture cross-section of the formation $\Sigma_F$ from the relation, $$\Sigma_F = 4545/\tau_F.$$

9. The method of claim 7 further comprising repeating said steps at depth locations within said borehole and recording said borehole compensated rate of decay of thermal neutrons of said earth formations as a function of borehole depth.

10. The method of claim 9 wherein,
said first signals are generated after a relatively short delay time after the end of said first burst of fast neutrons, and
said second signals are generated after a relatively long delay time after the end of said second burst of fast neutrons,
said short delay allowing the fast neutrons to become thermalized, and
said long delay eliminating at least a portion of the indications of concentration of thermal neutrons in said borehole materials following said long neutron burst, and providing a time delay for the count rate to fall to measurable (dead time correctable) level.

11. The method of claim 10 wherein
said first signals are gamma ray count rate signals accumulated in a first series of time gates following said short delay, said first series of time gates beginning with a gate of a first narrow width, with each successive gate having a wider width than its preceding gate, and
wherein said second signals are gamma ray count rate signals accumulated in a second series of time gates following said long delay, said second series of time gates beginning with a gate of a second narrow width, with each successive gate having a wider width than its preceeding gate.

12. The method of claim 11 wherein
said gates of said first series of time gates are contiguous, and
said gates of said second series of time gates are contiguous.

13. The method of claim 12 wherein
said long time burst of fast neutrons is provided immediately following the last gate of said first series of time gates.

14. The method of claim 7 wherein said step of determining the exponential decay time constant of thermal neutrons of said earth formation, $\tau_F$, and the exponential decay time constant of thermal neutrons of said borehole, $\tau_B$, comprises the sub-steps of,
(a) estimating the initial value AFL and time constant $\tau_F$ of a formation decay exponential from said second signals,
(b) correcting said first signals and said second signals for the exponential formation decay from the previous long burst to produce corrected first and second signals,
(c) estimating the initial value AFS of a formation decay exponential resulting from said short burst, said exponential having the same $\tau_F$ determined in step (a),
(d) recorrecting said corrected second signals for the exponential formation decay from the short burst to produce recorrected second signals,
(e) stripping a formation decay exponential resulting from said short burst from said corrected first signals to produce stripped first signals, (f) estimating the initial value ABS and time constant $\tau_B$ of a borehole decay exponential from said stripped first signals, (g) estimating the initial value ABL of a borehole decay exponential resulting from said long burst, said exponential having the same $\tau_B$ determined in step (f), (h) stripping from said recorrected second signals the borehole exponential decay gamma ray signals of initial value ABL and time constant $\tau_B$ which result from said long burst to produce stripped second signals, (i) re-estimating from said stripped second signals the initial value AFL and time constant $\tau_F$ of a formation decay exponential from said stripped second signals, and (j) repeating sub-steps (b) through (i) until $\tau_F$ and $\tau_B$ do not change more than a predetermined amount from one repetition of steps (b) through (i) to the next.

15. The method of claim 6 wherein said step of determining the rate of decay of thermal neutrons of said earth formation, $\tau_F$ comprises the sub-steps of (a) estimating the initial value AFL and time constant $\tau_F$ of a formation decay exponential from said second signals, (b) subtracting from said first signals a residual exponential component as a function of time which results from decaying formation gamma rays from a preceeding long burst to determine corrected first signals, (c) estimating the initial value AFS of the formation decay exponential within said corrected first signals by means of a charge-up relation, $$AFS = AFL \frac{(1 - e^{-tS/\tau_F})}{(1 - e^{-tL/\tau_F})},$$

where $t_S$ is the time length of the short burst, and $t_L$ is the length of the long burst, (d) subtracting from said second signals a residual exponential component as a function of time which results from decaying formation gamma rays from said preceding long burst and a residual exponential component as a function of time which results from decaying formation gamma rays from said preceding short bursts to determine corrected second signals, (e) stripping from said corrected first signals the formation exponential decay gamma ray signals which result from said short burst to produce stripped first signals, (f) estimating from said stripped first signals the initial value ABS and time constant $\tau_B$ of a borehole decay exponential from said stripped first signals, (g) estimating the initial value ABL of the borehole decay exponential within said corrected second signals by means of a charge-up relation, $$ABL = ABS \frac{(1 - e^{-tL/\tau_B})}{(1 - e^{-tS/\tau_B})},$$

(h) stripping from said corrected second signals the borehole, exponential decay gamma ray signals of initial value ABL and time constant $\tau_B$ which result from said long burst to produce stripped second signals, (i) re-estimating from said stripped second signals the initial value AFL and time constant $\tau_F$ of a formation decay exponential from said stripped second signals, and (j) repeating sub-steps (b) through (i) until $\tau_F$ and $\tau_B$ do not change more than a predetermined amount from one repetition of steps (b) through (i) to the next.

16. The method of claim 10 wherein said short burst, short burst detection period, long burst, long burst detection period is repeated forming a burst-detection series, said first signals are gamma ray count rate signals GS accumulated in a first series of time gates following said short delay, said second signals are gamma ray count rate signals GL accumulated in a second series of time gates following said long delay, and wherein said method includes the substeps of (a) determining a first estimate of the decay characteristics following said long burst with an exponential function of the form $$f_{FL1}(t'') = (AFL1)e^{-t''/\tau_{F1}},$$

from said second series of time gate signals GL, where AFL1 is the first estimate of the number of gamma rays occurring in the formation at the end of said long burst, $\tau_{f1}$ is the first estimate of the time decay constant of said gamma rays in the formation, and $t''$ is a time variable from the end of the long burst, (b) determining first residual count rate signals in said first series of time gates GS and in said second series of time gates GL which result from the formation decay exponential $f_{FL1}(t)$ of the previous long burst formation decay in the burst-detection series and subtracting said first residual count rate signals from said GS signals and said GL signals to produce first residual free signals GS* and GL*, (c) determining a first estimate of the decay characteristic of formation gamma rays following said short burst with an exponential function of the form $$f_{FS1}(t') = (AFS1)e^{-t'/\tau_{F1}},$$

from a gamma ray "charge-up" relation, $$AFS1 = (AFL1) \frac{(1 - e^{-tS/\tau_{F1}})}{(1 - e^{-tL/\tau_{F1}})},$$

where $t_S$ is the time length of said short burst, $t_L$ is the time length of said long burst, AFS1 is the first estimate of the number of gamma rays occurring in the formation at the end of the short burst, and $t'$ is a time variable from the end of the short burst, (d) determining second residual count rate signals in said first series of time gates and in said second series of time gates which result from the formation decay exponential $f_{FS1}(t')$ resulting from the short burst of fast neutrons and subtracting said second residual count rate signals from said first residual free signals GS* and GL* to produce second residual free signals GS and GL, (e) determining from said GS** signals a first estimate of the decay characteristic of borehole gamma rays following said short burst with an exponential function of the form, $$f_{BS1}(t') = (ABS1)e^{-t'/\tau_{B1}},$$

where ABS1 is the first estimate of the number of gamma rays occurring in the borehole at the end of said short burst, $\tau_{B1}$, is the first estimate of the time decay constant of said gamma rays in the borehole materials, and t' is a time variable from the end of the short burst, (f) determining a first estimate of the borehole decay exponential function following said long burst of the form, $$f_{BL1}(t'') = (ABL1)e^{-t''/\tau_{B1}},$$

from a gamma ray charge-up relation, $$ABL1 = (ABS1) \frac{(1 - e^{-tL/\tau_{B1}})}{(1 - e^{-tS/\tau_{B1}})},$$

where ABL1 is the first estimate of the number of gamma rays occurring in the borehole materials at the end of the long burst, (g) determining an estimate of the signal level of said second series of time gates of gamma rays following the long burst by subtracting the count rate signals which result from said borehole decay exponential function $f_{BL1}(t'')$ from said second residual free signals GL to produce a revised series of time gate signals GL*, (h) determining a revised estimate of the decay characteristics of gamma rays following said long burst with an exponential function of the form $$f_{FL1}^*(t'') = AFL1^* e^{-t''/\tau^*_{F1}}$$

from said revised series of time gate signals GL***, and (i) repeating sub-steps (b) through (h) until $\tau_F$ and $\tau_B$ do not change more than a predetermined amount from one repetition of steps (b) through (h) to the next.

17. The method of claim 16 wherein said second series of time gates begins with a gate G1L of a narrow width with each successive gate having a wider width than its preceding gate, and ends with gate G8L where 8 is the number of gates and where in said sub-step (a) of determining said first estimate of said formation decay exponential, only a predetermined set of later gates are used in estimating AFL1 and $\tau_F$, and where in said sub-step (h) of determining said revised estimate of said formation decay exponential, using at least one additional one of said gates closer to the end of said long burst in re-estimating AFL and $\tau_F$.

18. The method of claim 16 wherein said count rate signals of said time gate signals GL and GS are converted to natural logarithm signals by taking the natural logarithm of the count rate of each time gate, and said estimate of AFL and $\tau_F$ and ABS and $\tau_B$ are determined by fitting a straight line respectively to said logarithm signals GL and GS where the slope of said straight line is the time constant of the exponential function and the intercept after the end of the respective burst is the initial value of the exponential function.

19. The method of claim 14 further comprising the step of determining the background gamma ray count rates occurring naturally in said borehole materials and in said formation and occurring through activation of said borehole materials and in said formation by repeated neutron bursting, and subtracting said background gamma ray count from said first and second gamma ray count rate signals as a function of time, and determining background corrected first and second logarithmic functions of time.

20. Apparatus for determining thermal neutron decay characteristics of the formation, comprising, means for providing a first relatively short time burst of fast neutrons at a location within the borehole thereby irradiating borehole materials and the earth formation adjacent said borehole location, means for detecting indications of the concentration of thermal neutrons in the formation and in said borehole materials following said short neutron burst and generating first signals in response thereto, means for providing a relatively long time burst of fast neutrons at substantially the same said location within the borehole thereby again irradiating said borehole materials and the earth formation adjacent said borehole location, means for detecting indications of the concentration of thermal neutrons in the formation and in said borehole materials following said long neutron burst and generating second signals in response thereto, and means for determining from said first signals and from said second signals the rate of decay of thermal neutrons of said earth formation, $\tau_f$.

21. In a logging system having neutron generating means and detecting means for detecting indications of thermal neutrons, a method for determining thermal neutron decay characteristics of borehole materials and the surrounding earth formation comprising the steps of:

irradiating the borehole materials and earth formations with a first burst of neutrons, detecting in one or more time intervals following said first burst count rates of indications of the concentration of thermal neutrons in the formation and borehole materials and generating first signals representative thereof, said first burst being of a first duration, such that after a first delay from the end of the first burst, the thermal neutron count rate component due to borehole materials predominates in the total thermal neutron count rate detected in said one or more time intervals associated with said first burst, irradiating the borehole materials and earth formation with a second burst of neutrons, detecting in one or more time intervals following said second burst count rates of indications of the concentration of thermal neutrons in the formation and borehole materials and generating second signals representative thereof, said second burst being of a second duration such that after a second delay from the end of the second burst, the thermal neutron count rate component due to the formation predominates in the total thermal neutron count rate detected in said one or more time intervals associated with said second burst, and determining from said first and second signals a characteristic of thermal neutron decay of the formation and the borehole.

22. In a logging system having a neutron generating means and detecting means for detecting indications of thermal neutrons, a method for determining thermal neutron decay characteristics of borehole materials comprising the steps of:

irradiating the borehole materials and earth formations with a first burst of neutrons, detecting in one or more time intervals following said first burst count rates of indications of the concentration of thermal neutrons in the formation and borehole materials and generating first signals representative thereof, said first burst being of a duration chosen such that after a first delay from the end of the first burst, the total count rate due to the borehole materials and to the formation does not exceed the maximum counting rate of said detecting means and the thermal neutron count rate component due to borehole materials predominates in the total thermal neutron count rate detected in one or more of said intervals associated with said first burst, and determining from said first signals a characteristic of the thermal decay of the borehole.

23. The method of claim 22 further comprising the steps of:

irradiating the borehole materials and earth formation with a second burst of fast neutrons, detecting in one or more time intervals following said second burst count rates of indications of the concentration of thermal neutrons in the formation and borehole materials and generating second signals representative thereof, said second burst being of a duration chosen such that after a second delay from the end of the second burst, the total count rate due to the borehole materials and to the formation does not exceed the maximum counting rate of said detecting means and the thermal neutron count rate component due to the formation predominates in the total thermal neutron count rate, detected in one or more of said intervals associated with said second burst, and determining from said first and second signals a characteristic of the thermal decay constant of the formation.

24. The method of claim 23 further comprising the step of:

simultaneously determining from said first and second signals the thermal decay constant of the borehole materials.

25. The method of claim 23 wherein:
said first delay is about 18 microseconds, and
said second delay is about 60 microseconds.

26. The method of claims 21, 23, or 25 wherein:
said first burst is of a duration of about 20 microseconds, and
said second burst is of a duration of about 160 microseconds.

27. In a borehole logging system having a neutron generating means and detecting means for detecting indications of neutrons, a method for determining neutron decay characteristics, where the neutron decay is characterized by the sum of components which decay at different rates, comprising the steps of:

irradiating the borehole materials and earth formations with a first burst of neutrons, detecting in one or more time intervals following said first burst by a short delay, count rates of indications of the concentration of neutrons in the formation and borehole materials and generating first signals representative thereof, said first burst being of a duration which is relatively short such that the total count rate due to the borehole materials and to the formation does not exceed the maximum counting rate of said detecting means and the neutron count rate component due to a selected decay component decaying at a rapid rate dominates in the total neutron count rate detected in said one or more time intervals, and determining from said first signals a characteristic related to said selected decay component.

28. The method of claim 27 further comprising the steps of:

irradiating the borehole materials and earth formation with a second burst of neutrons, detecting in one or more time intervals following said second burst count rates of indications of the concentration of neutrons in the formation and borehole materials and generating second signals representative thereof, said second burst being of a duration which is relatively long as compared to said first burst, and determining from said second signals a characteristic related to another decay component having a decay rate which is slower than said selected decay component.

29. The method of claim 27 wherein:
said first burst is of a duration of about 20 microseconds.

30. The method of claims 28 or 29 wherein:
said second burst is of a duration of about 160 microseconds.

31. The method of claim 27 or 28 wherein:
said selected decay component is related to neutron decay characteristics of borehole materials and said short delay is of a duration of about 18 microseconds.

32. A logging system for determining thermal neutron decay characteristics of borehole materials and the surrounding earth formation comprising:

neutron generating means, means for detecting indications of thermal neutrons, means for irradiating the borehole materials and earth formations with a first burst of neutrons, means for detecting in one or more time intervals following said first burst count rates of indications of the concentration of thermal neutrons in the formation and borehole materials and generating first signals representative thereof, said first burst being of a first duration, such that after a first delay from the end of the first burst, the thermal neutron count rate component due to borehole materials predominates in the total thermal neutron count rate detected in said one or more time intervals associated with said first burst, means for irradiating the borehole materials and earth formation with a second burst of neutrons, means for detecting in one or more time intervals following said second burst count rates of indications of the concentration of thermal neutrons in the formation and borehole materials and generating second signals representative thereof, said second burst being of a second duration such that after a second delay from the end of the second burst, the thermal neutron count rate component due to the formation predominates in the total thermal neutron count rate detected in said one or more time intervals associated with said second burst, and means for determining from said first and second signals a characteristic of thermal decay of the formation and the borehole.

33. A logging system for determining thermal neutron decay characteristics of borehole materials comprising:

neutron generating means, means for detecting indications of thermal neutrons, means for irradiating the borehole materials and earth formations with a first burst of neutrons, means for detecting in one or more time intervals following said first burst count rates of indications of the concentration of thermal neutrons in the formation and borehole materials and generating first signals representative thereof, said first burst being of a duration chosen such that after a first delay from the end of the first burst, the total count rate due to the borehole materials and to the formation does not exceed the maximum counting rate of said detecting means and the thermal neutron count rate component due to borehole materials predominates in the total thermal neutron count rate detected in one or more of said intervals associated with said first burst, and means for determining from said first signals a characteristic of the thermal decay of the borehole.

34. The apparatus of claim 33 further comprising:

means for irradiating the borehole materials and earth formation with a second burst of fast neutrons, means for detecting in one or more time intervals following said second burst count rates of indications of the concentration of thermal neutrons in the formation and borehole materials and generating second signals representative thereof, said second burst being of a duration chosen such that after a second delay from the end of the second burst, the total count rate due to the borehole materials and to the formation does not exceed the maximum counting rate of said detecting means and the thermal neutron count rate component due to the formation predominates in the total thermal neutron count rate, detected in one or more of said intervals associated with said second burst, and means for determining from said first and second signals a characteristic of the thermal decay constant of the formation.

35. The apparatus of claim 34 further comprising:

means for simultaneously determining from said first and second signals the thermal decay constant of the borehole materials.

36. The apparatus of claim 34 wherein:

said first delay is about 18 microseconds, and said second delay is about 60 microseconds.

37. The apparatus of claims 32, 34 or 36 wherein:

said first burst is of a duration of about 20 microseconds, and said second burst is of a duration of about 160 microseconds.

38. A borehole logging system for determining thermal neutron decay characteristics, where the neutron decay is characterized by the sum of components which decay at different rates, comprising:

neutron generating means, means for detecting indications of neutrons, means for irradiating the borehole materials and earth formations with a first burst of neutrons, means for detecting in one or more time intervals following said first burst by a short delay, count rates of indications of the concentration of neutrons in the formation and borehole materials and generating first signals representative thereof, said first burst being of a duration which is relatively short such that the total count rate due to the borehole materials and to the formation does not exceed the maximum counting rate of said detecting means and the neutron count rate component decaying at a rapid rate due to a selected decay component dominates in the total neutron count rate detected in said one or more time intervals, and determining from said first signals a characteristic related to said selected decay component.

39. The apparatus of claim 38 further comprising:

means for irradiating the borehole materials and earth formation with a second burst of neutrons, means for detecting in one or more time intervals following said second burst count rates of indications of the concentration of neutrons in the formation and borehole materials and generating second signals representative thereof, said second burst being of a duration which is relatively long as compared to said first burst, and means for determining from said second signals a characteristic related to another decay component having a decay rate which is slower than said selected decay component.

40. The apparatus of claim 39 wherein:

said first burst is of a duration of about 20 microseconds.

41. The apparatus of claims 39 or 40 wherein:

said second burst is of a duration of about 160 microseconds.

42. The appratus of claims 38 or 39 wherein:

said selected decay component is related to neutron decay characteristics of borehole materials and said short delay is of a duration of about 18 microseconds.

* * * * *